United States Patent [19]
Yves

[11] Patent Number: 5,828,373
[45] Date of Patent: Oct. 27, 1998

[54] AID METHOD CONCERNING THE SPECIFICATION OF AN INTERFACE BETWEEN A CONTROL TERMINAL AND AT LEAST ONE COMPUTER

[75] Inventor: Saint Upery Yves, Toulouse, France

[73] Assignee: Aerospatiale Societe Nationale Industrielle, Paris, France

[21] Appl. No.: 662,015

[22] Filed: Jun. 12, 1996

[30] Foreign Application Priority Data

Jun. 13, 1995 [FR] France .................................. 95 06980

[51] Int. Cl.$^6$ ..................................................... G06F 15/00
[52] U.S. Cl. .......................... 345/333; 345/348; 345/967; 395/701
[58] Field of Search ..................................... 395/339, 340, 395/967, 970, 701, 702, 703, 704, 708; 345/333, 335

[56] References Cited

PUBLICATIONS

Harbert, et al., "A Graphical Specification System for User–Interface Design," *IEEE Software*—vol. 7(4), pp. 12–19 (1990).

*Primary Examiner*—Ba Huynh
*Attorney, Agent, or Firm*—Burns, Doane, Swecker & Mathis, LLP

[57] ABSTRACT

A method and system providing a specification of an interface between a control terminal in an aircraft at the disposal of an operator, such as a pilot, and a computer assisting in the piloting and navigation of the aircraft. The computer includes at least one memory containing at least one management software for managing the interface. The specification implements alphanumeric displays on the screen for controlling the actions of the operator on the keyboard. The specification is expressed in a data flow type graphic language including symbols relating to all the specified functions by using a data processing system. The symbols are connected by links so as to express a display configuration on the screen, a description of elementary actions able to be carried out by the operator, and a description of the responses of the terminal on order issued by the computer(s) and independent of the actions of the operator. The specification formulated as above provided with the data processing system makes it possible to check the coherency and accuracy of the specification.

15 Claims, 12 Drawing Sheets

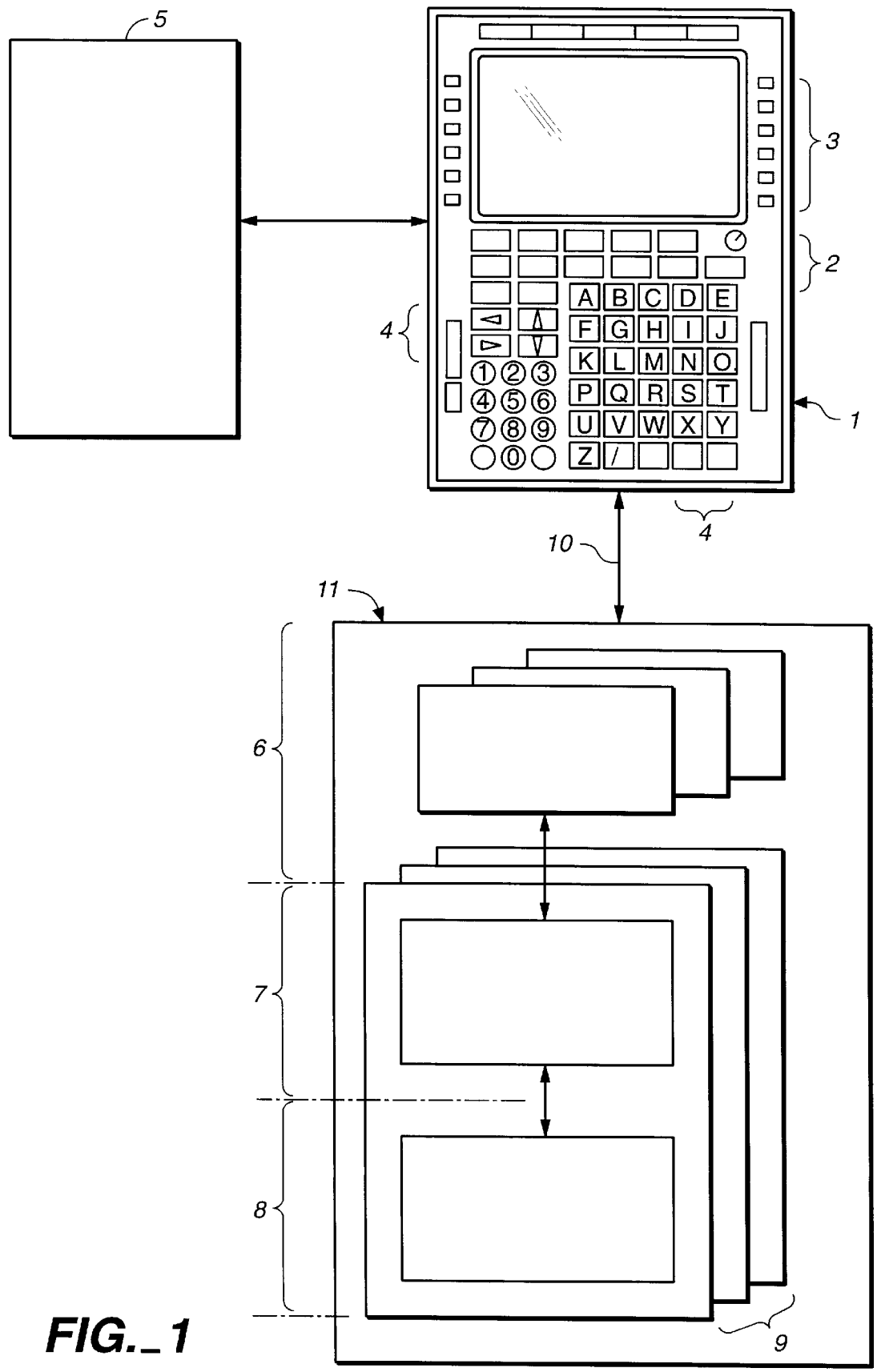
FIG._1

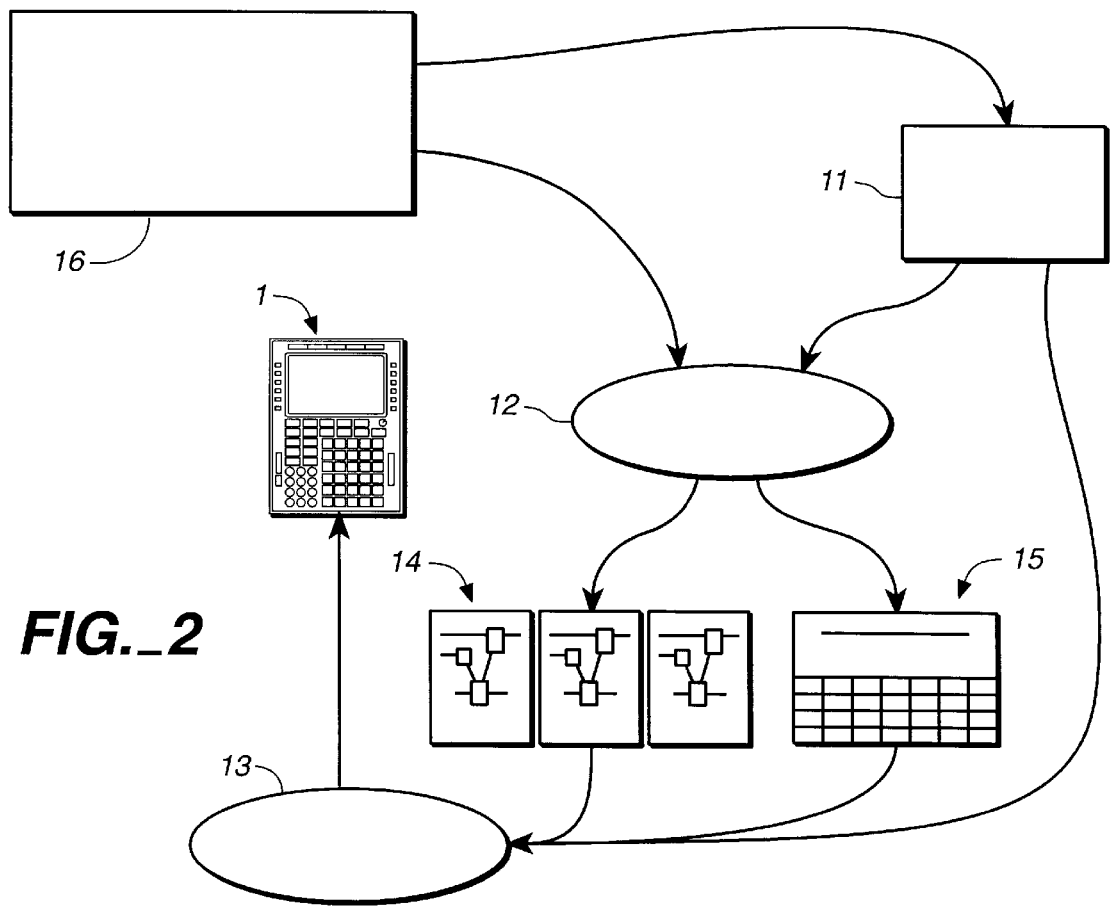

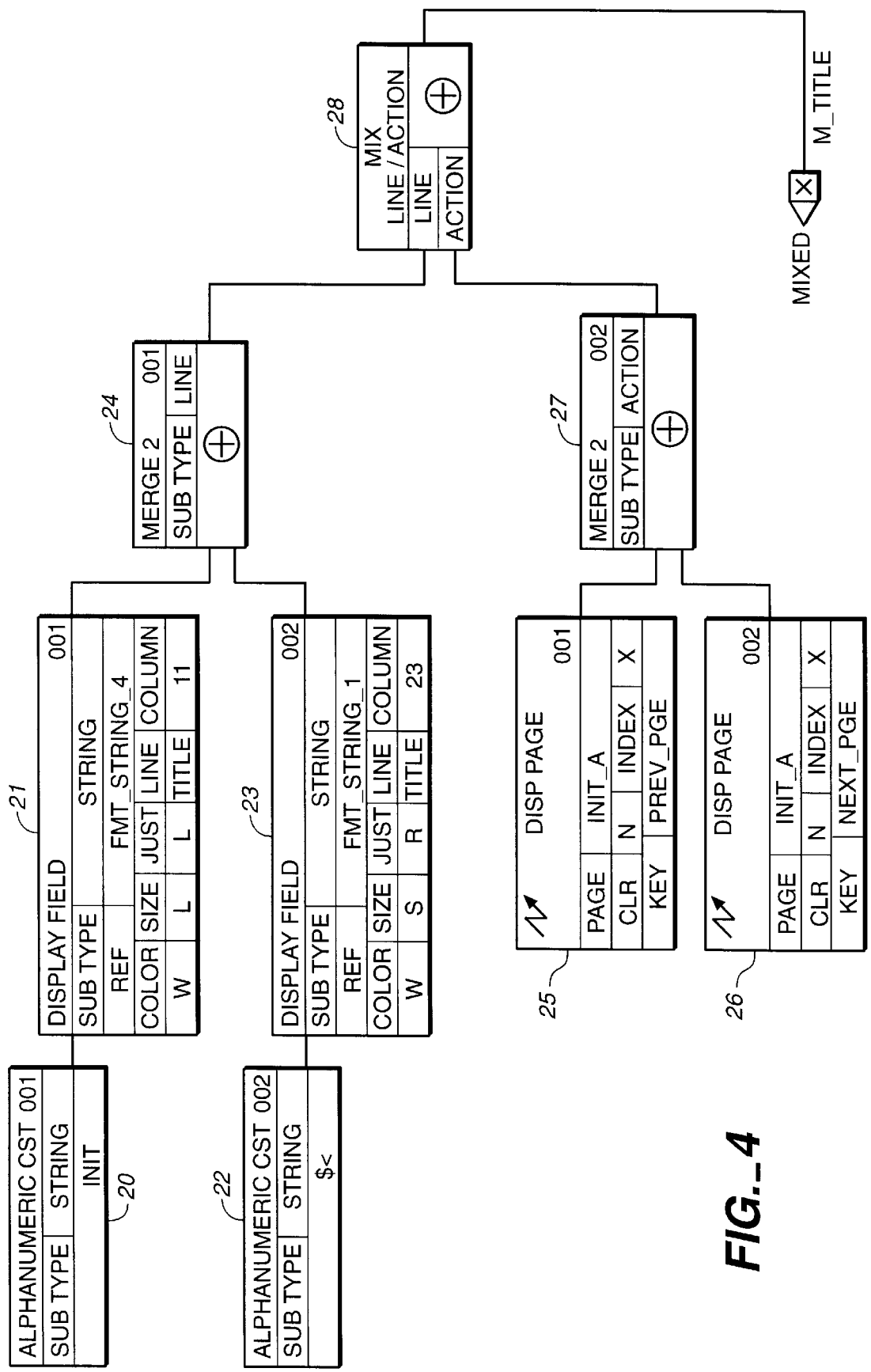
FIG._4

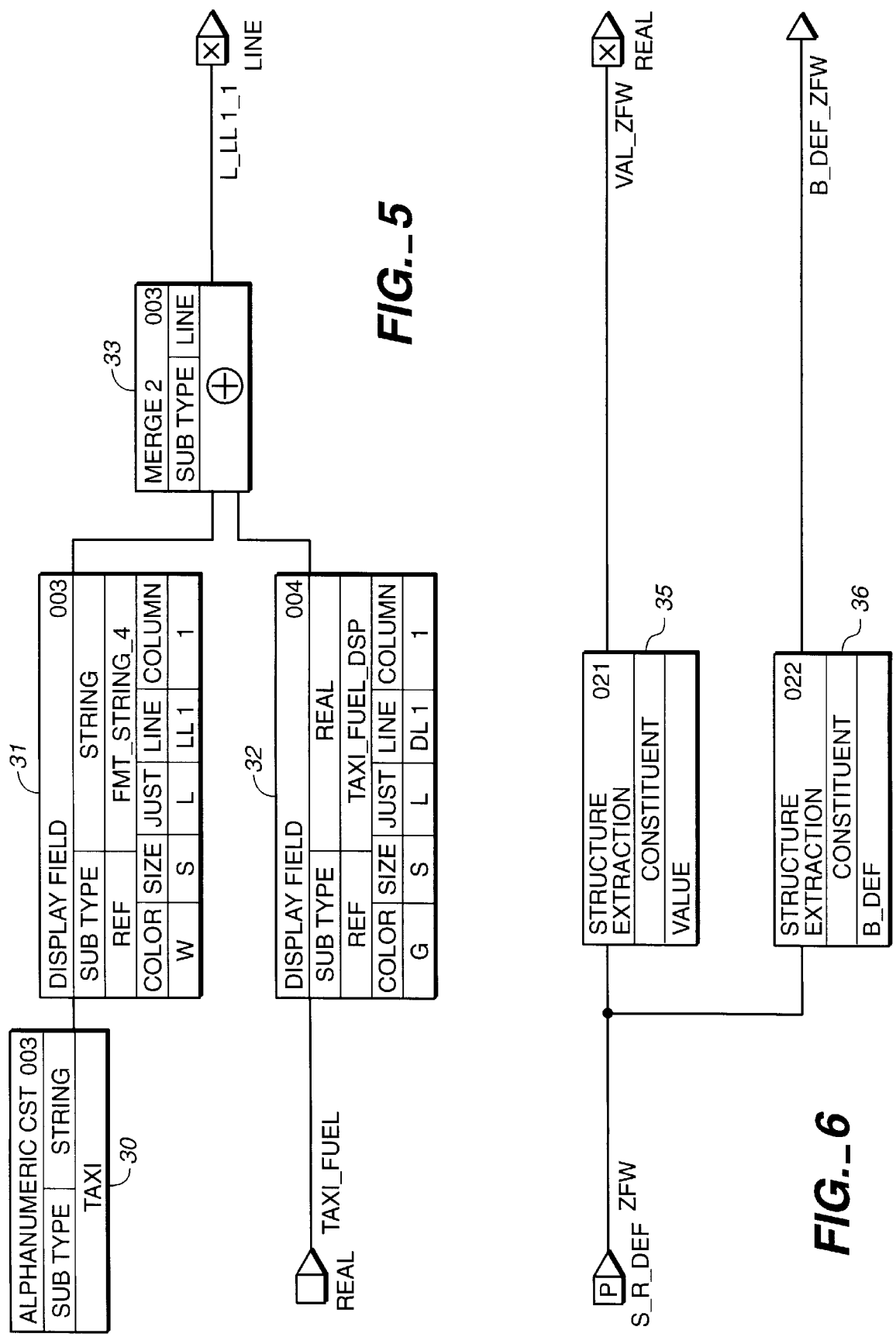

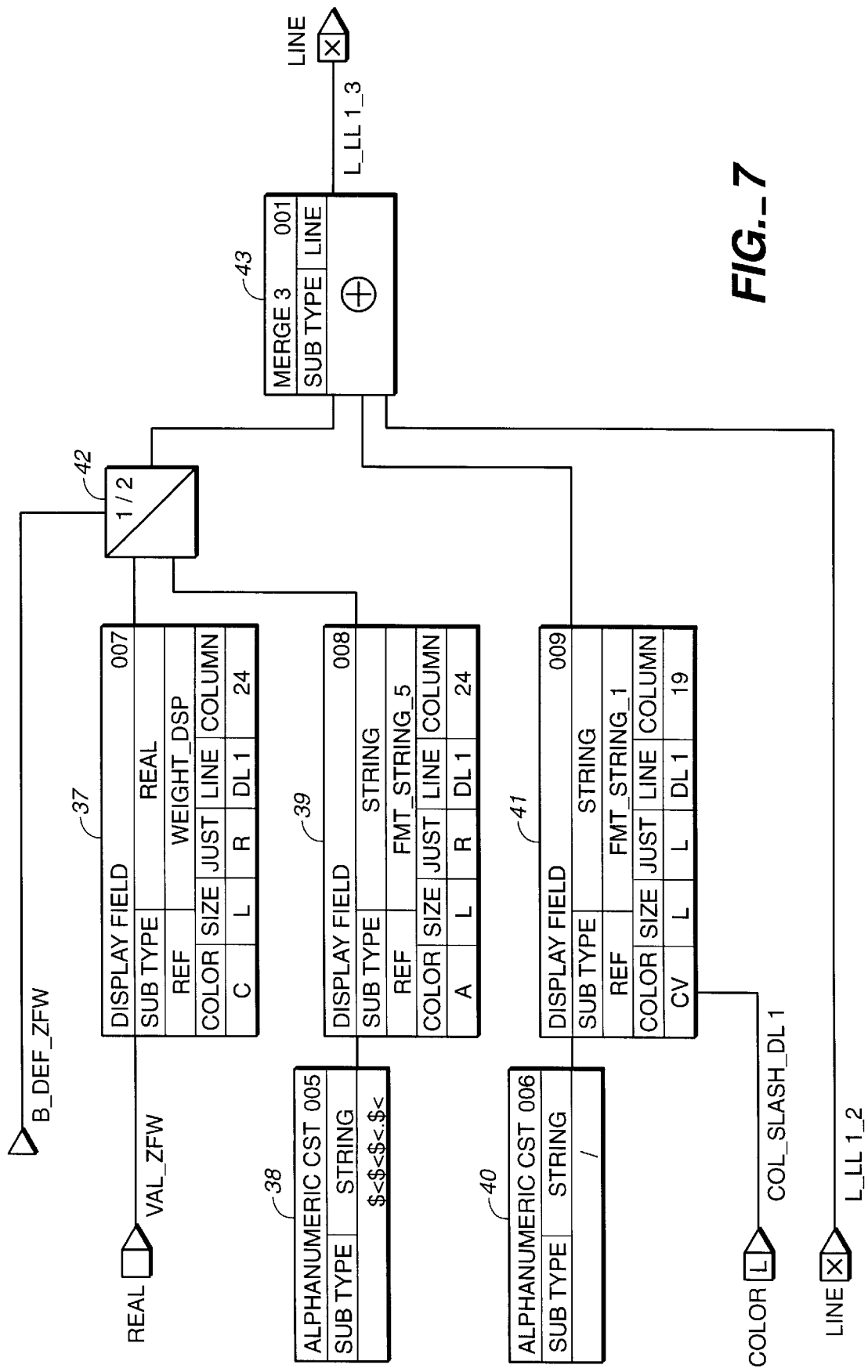
FIG._7

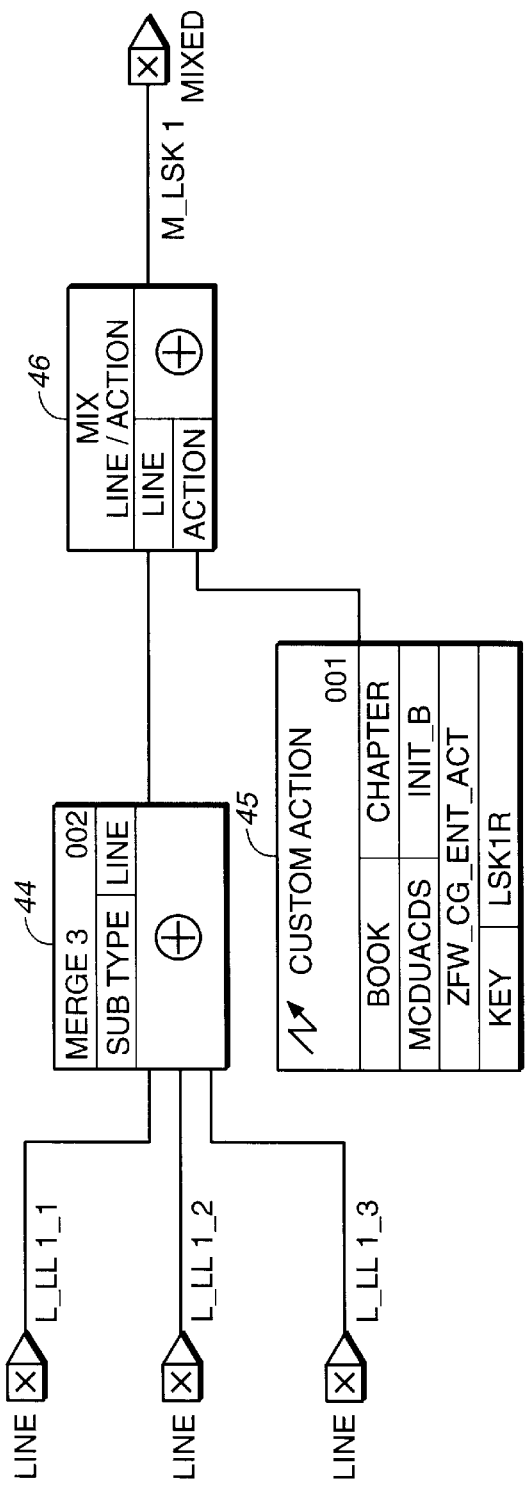
FIG._8
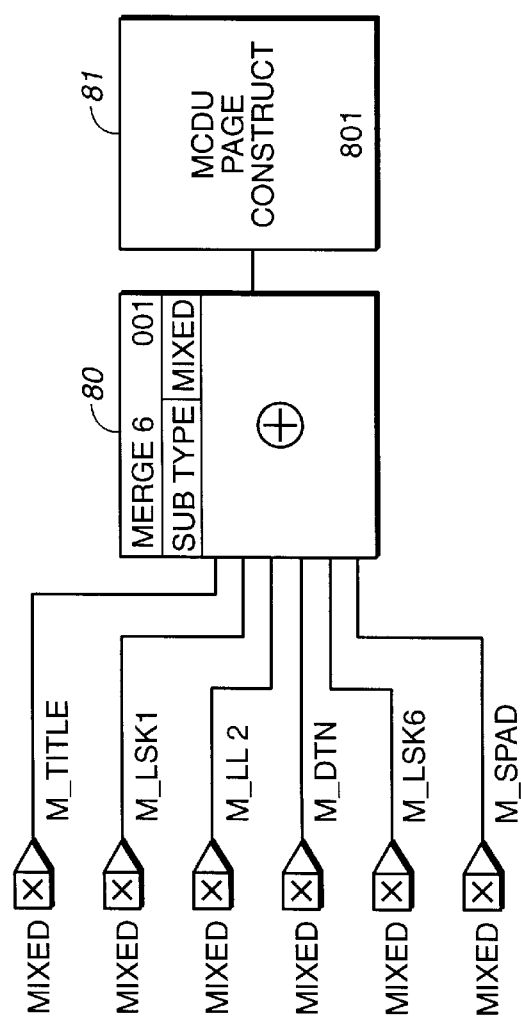
FIG._13

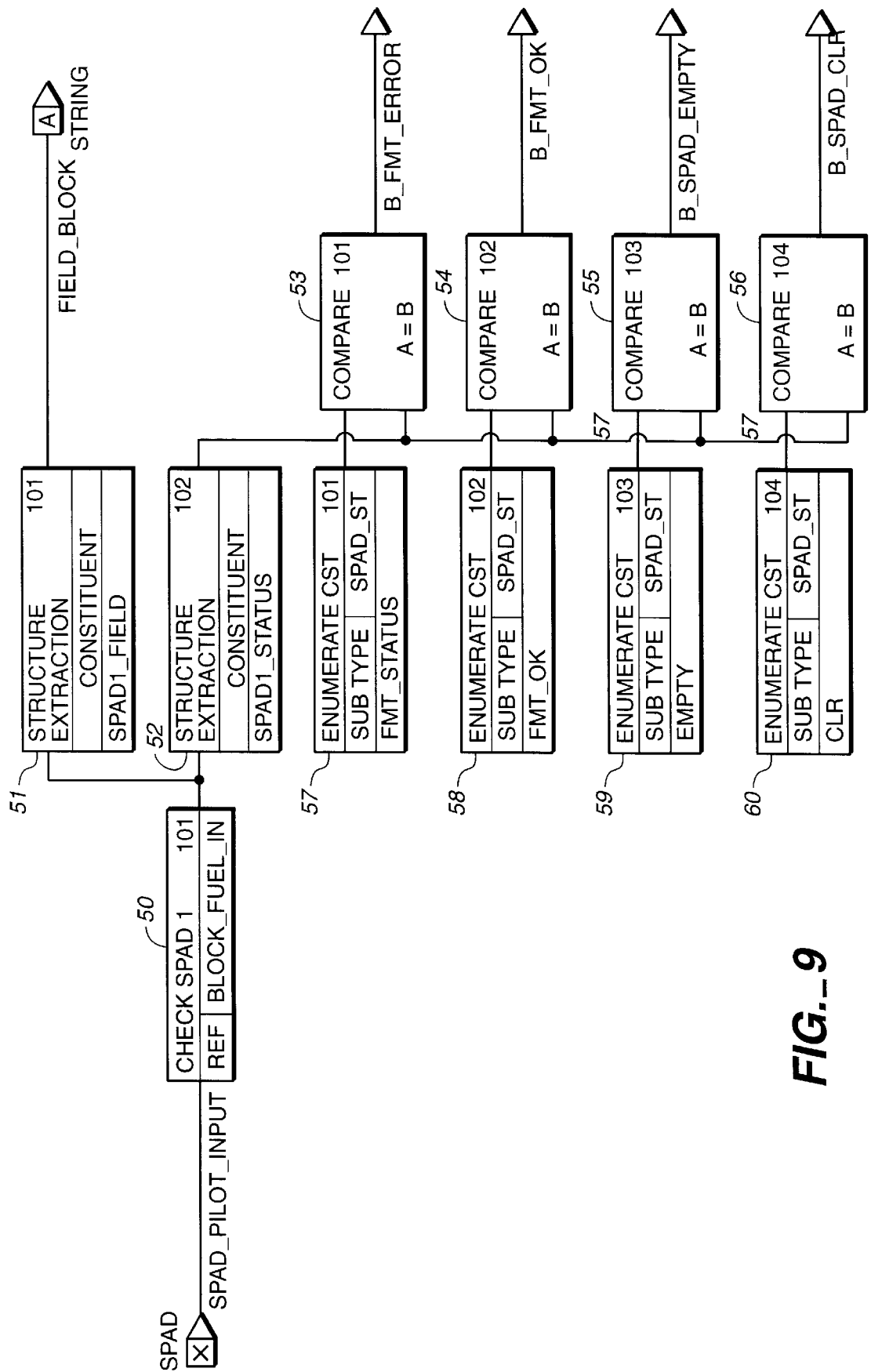
FIG._9

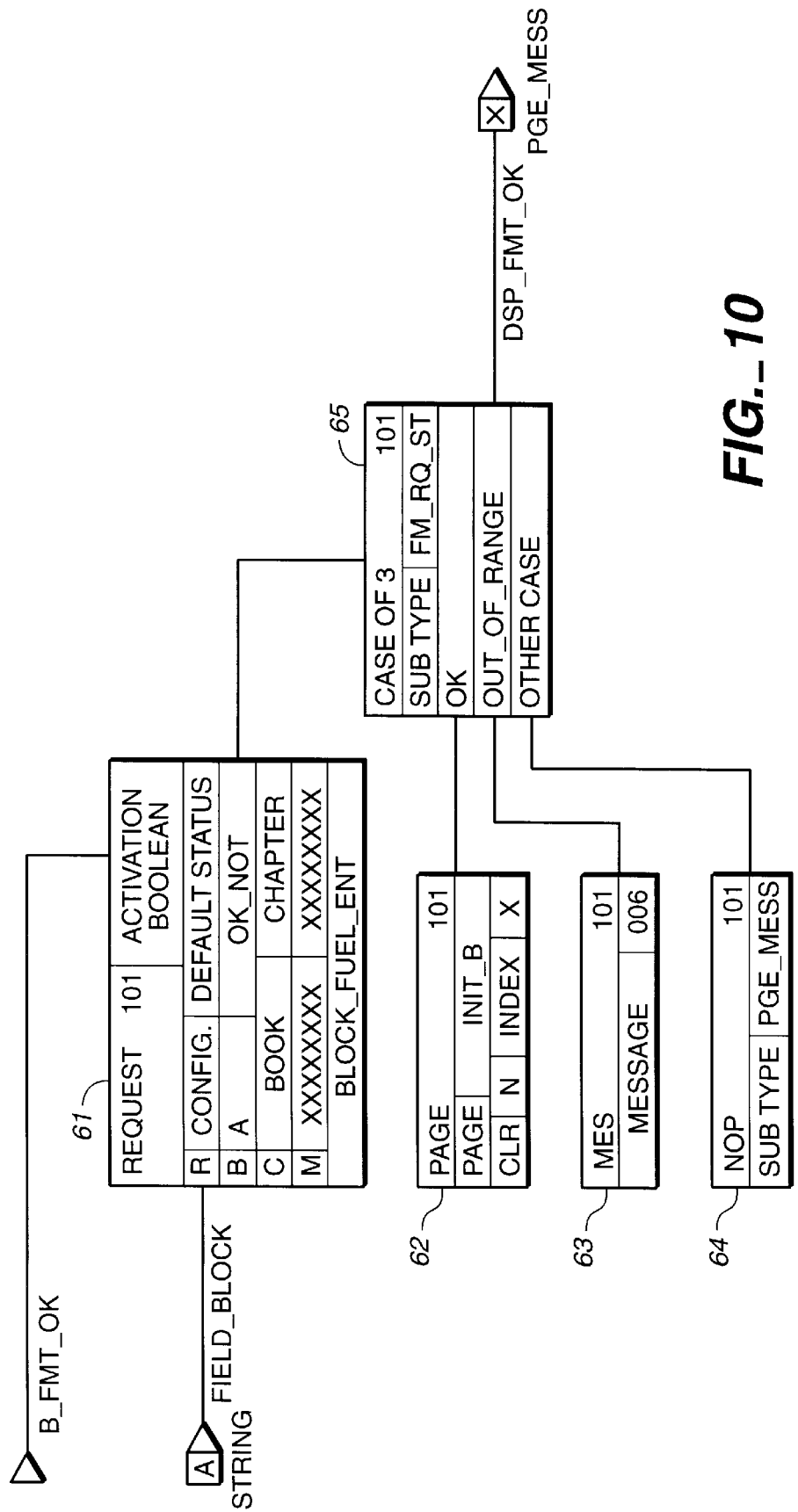
FIG._10

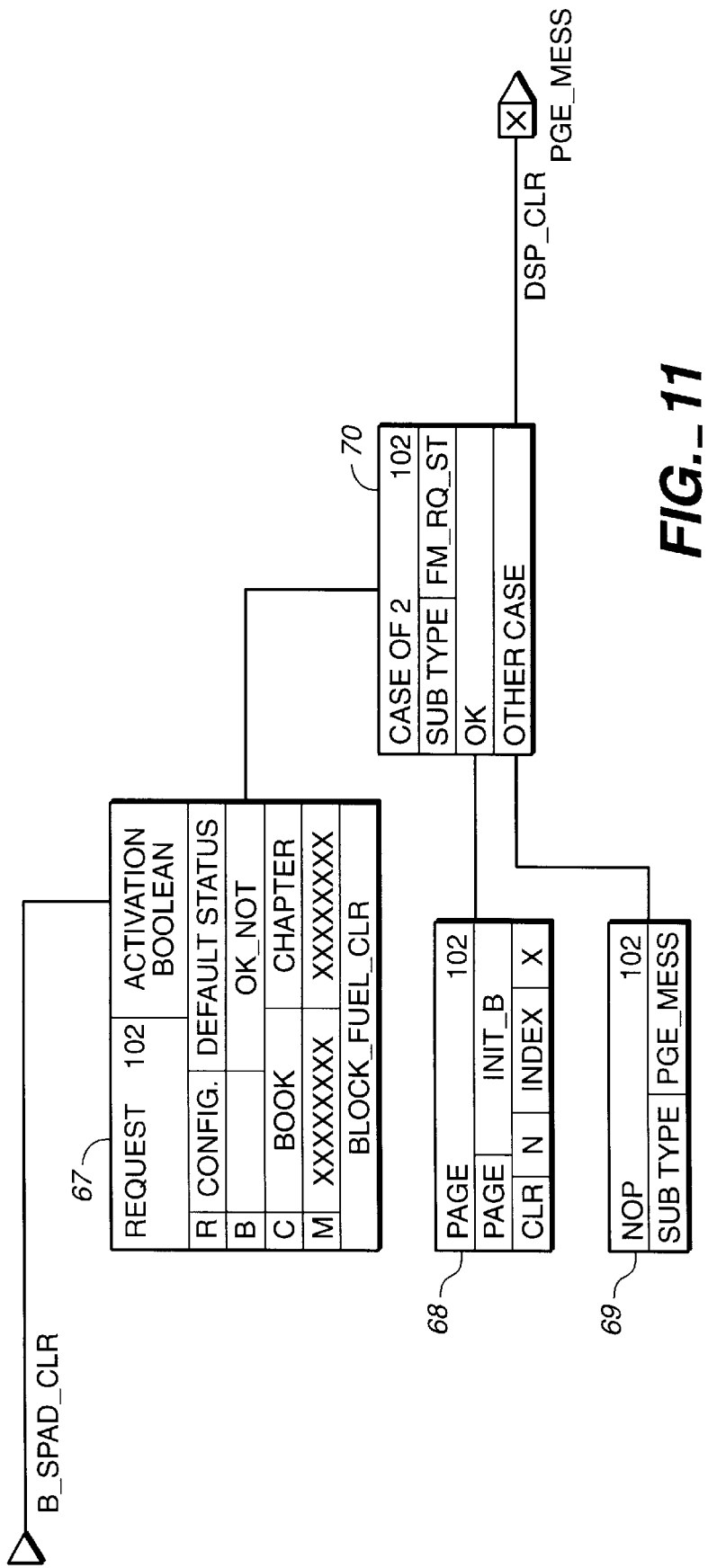
FIG._11

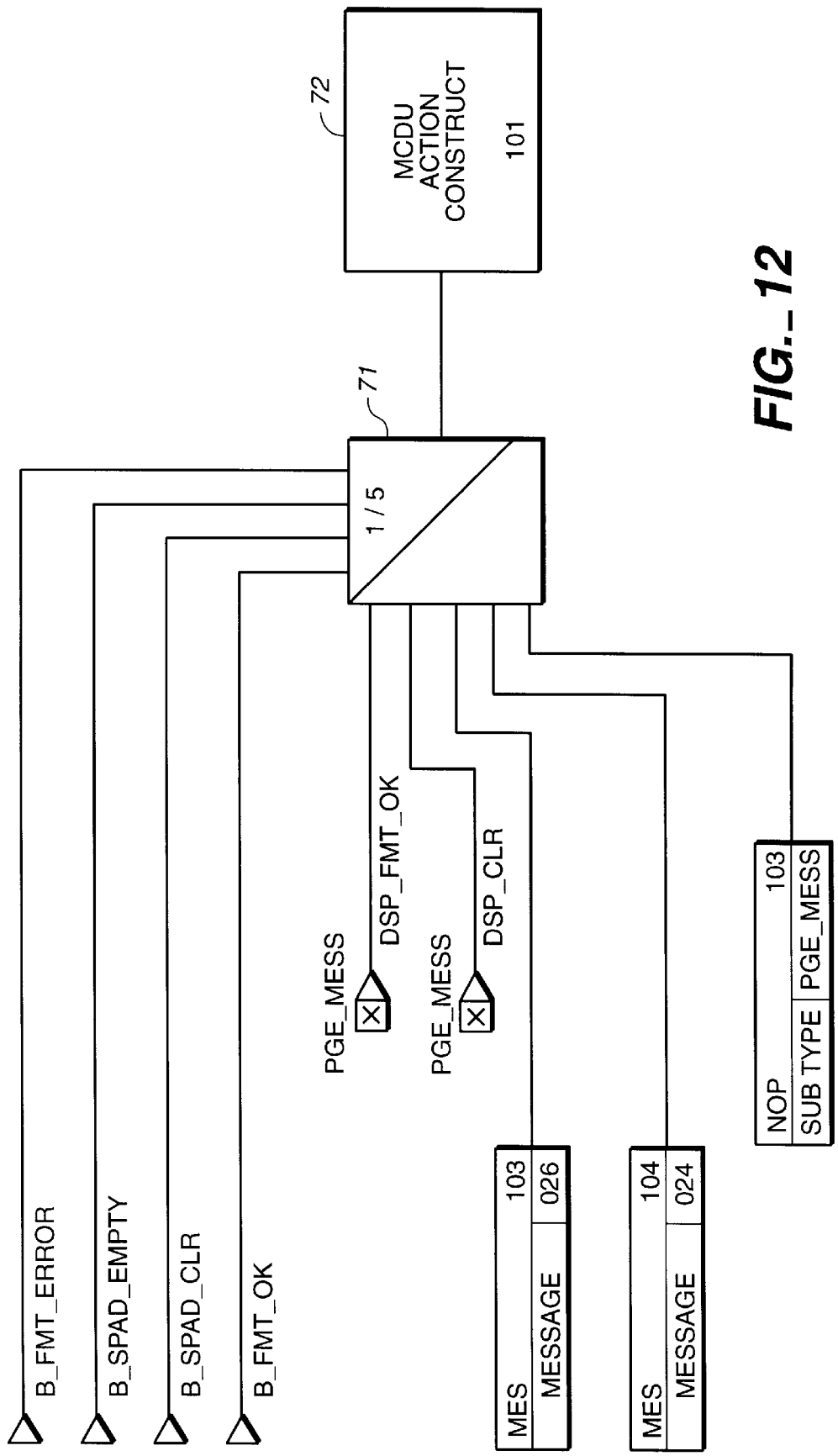
FIG._12

FIG._14

DISPLAY FIELD (FIELD.DSP)

| DISPLAY FIELD | | | | NNN(1) |
|---|---|---|---|---|
| SUB TYPE | \multicolumn{4}{l|}{XXXXXXX} |
| REF | \multicolumn{4}{l|}{XXXXXXXXXXXXXXX} |
| COLOR | SIZE | JUST | LINE | COLUMN |
| CV | SV | X | X | PV |

E1/1 (top-left), S1/1 (top-right), E2/1, E3/1, E4/1

FIG._15

DISPLAY PAGE (PAGE.ACT)

| PAGE | | | NNN(2) |
|---|---|---|---|
| PAGE | \multicolumn{3}{l|}{XXXXXXX} |
| CLR | N | INDEX | X |

EVENT DISPLAY MESSAGE (MES.DSP)

| ⟳ DISP MES | |
|---|---|
| | NNN |
| MESSAGE | NNN(3) |
| KEY | XXXXXXX |

DYNAMIC EVENT CUSTOMIZED ACTION (DYNACT.DSP)

| ⟳ CUSTOM ACTION | | | | |
|---|---|---|---|---|
| DYN | | | | NNN |
| BOOK | \multicolumn{4}{l|}{CHAPTER} |
| XXXXXXX | \multicolumn{4}{l|}{XXXXXXX} |
| \multicolumn{5}{l|}{XXXXXXXXXXXXXXX} |
| LSK | SIDE | SV | REL KEY | O |

EVENT SLEW BACKWARD (BACK.DSP)

| ⟳ BACKWARD | NNN(5) |
|---|---|
| \multicolumn{2}{l|}{XXXXXXXXXXXXXXX} |
| KEY | XXXXXXX |

EVENT SLEW FORWARD (FORWARD.DSP)

| ↗ FORWARD NNN(6) | S1 / 6 |
|---|---|
| XXXXXXXXXXXXXXXX | |
| KEY | XXXXXXXX |

FIG._20

MCDU PAGE CONSTRUCT (MCDUPAGE.DSP)

E1 / 7  | MCDU PAGE CONSTRUCT  NNN (7) |

FIG._21

CHECK SCRATCHPAD 1 (SPAD1.ACT)

| E1 / 8 | CHECK SPAD 1    NNN(8) | S1 / 8 |
|---|---|---|
| | XXXXXXXXXXXXXXXX | |
| | REF | XXXXXXXX |

FIG._22

FM REQUEST (FMRQST.ACT)

| | | | | |
|---|---|---|---|---|
| E1 / 9 | REQUEST | NNN | ACTIVATION BOOLEAN | |
| E2 / 9 | R | CONFIG. | DEFAULT STATUS | |
| E3 / 9 | B | XXXX | OK_NOT | S1 / 9 |
| E4 / 9 | C | BOOK | CHAPTER | |
| E5 / 9 | M | XXXXXXXX | XXXXXXXX | |
| | XXXXXXXXXXXXXXXX | | | |

FIG._23

ACTION CONSTRUCT (MCDUACT.DSP)

E1 / 10 | MCDU ACTION CONSTRUCT  NNN (10) |

AID METHOD CONCERNING THE SPECIFICATION OF AN INTERFACE BETWEEN A CONTROL TERMINAL AND AT LEAST ONE COMPUTER

FIELD OF THE INVENTION

This invention relates to an aid system and method concerning the specification of an interface between a control terminal at the disposal of an operator and at least one computer.

In general, the invention is applicable to vehicles and more particularly aircraft, but also complex land installations, such as nuclear power stations.

Thus, in one advantageous application, a computer helps in guiding and navigating an aircraft, the other computers being provided to ensure maintenance, transmission to the ground of technical information linked to the current flight (ACARS), etc.

Further, in the description, particularly by way of example, the application of the invention process to an aircraft will be described.

STATE OF THE PRIOR ART

In various aircraft programs, such as Airbus programs, a specification of the man/machine interface (MMI) of a multifunctional terminal can be described in a text form and illustrated by screen display examples.

The text portion of this specification contains information display logic on the screen, position characteristics on the screen, size, color of the displayed information, as well as action logic which may be carried out following the use of the information input elements of the terminal.

The techniques currently used mean that the specifications produced do not have any formalized character (undefined data, no syntax rules for expression of requirements). It is therefore impossible to control the specifications, that is, ensure their correctness, coherence and completeness. The equipment manufacturer is manually developing the software for this function on the basis of a specification which has not been able to be controlled.

Secondly, the specification is not formalized and may therefore be ambiguous and subject to the interpretation of the equipment producer: the product may not correspond to requirements although conforming to the specification.

A previous French patent application no. 90 05068 filed on 20 Apr. 1990 describes an interaction method for producing a source code software modeling the complex units of functional modules.

This method consists of implementing in a computer connected to a display means a graphic editing software representing block diagrams composed of symbols or transfer functions connected by data flows and recorded in a memory of the computer developing graphic boards, a software for producing a symbol precoding file, a software for controlling coherence between the symbols of each board, a software for controlling coherence of the time chaining of the order and the board execution conditions. The method also consists of recording in the memory a control dictionary for updating the boards. Finally, the source code software is produced from a software processing the contents of the preceding file and the contents of the dictionary.

On the other hand, this invention relates to a method able to obtain a detailed formalization of the specification of an interface between a control terminal in an aircraft at the disposal of an operator, such as a pilot, and a computer assisting in the piloting and navigation of this aircraft, this formalization allowing a formalized and detailed specification to be produced which can be controlled statistically (syntax) and validated dynamically (functioning) and accordingly control the software concerning this function. In particular, it shall be possible to transmit this detailed specification to a computer (or data processing) system which shall be able to validate it via simulation.

SUMMARY OF THE INVENTION

As shall be seen subsequently in the description of the MCDU terminal, the man/machine dialogue is carried out within the context of pages displayed one after the other on the screen of the terminal, the pages listing information according to their nature, relationship, such as fuel, flight plan, etc.

This invention relates to an aid system and method concerning the specification of an interface between a control terminal including a screen and a keyboard at the disposal of an operator and at least one computer, the computer including at least one memory containing at least one software for managing said interface, said specification implementing alphanumeric displays on said screen and the actions of the operator on said keyboard, wherein:

the specification is expressed in a data flow type graphic language including symbols relating to all the specified functions by using a computer system;

these symbols are connected by links so as to express:
a specification of the display of one page on said screen,
a description of all the elementary actions associated with this display configuration, a formalized specification is then obtained:
after processing said formalized specification in a software generation computer, the management software of said interface is obtained.

The screen and control keyboard are preferably those of an MCDU (<<Multifunction Control and Display Unit>>) multifunction terminal. The specification of the display of a page on the screen consists of:
a description of the logic governing the display of information shown on the screen;
a description of the presentation characteristics of the information to be displayed (color, size, position on the screen);
an association of possible actions on the keyboard line keys and functional keys coherently with display.

An editor is able to define the symbols using graphic language elements which are stored in computer files.

The invention therefore consists of a method able to express in a graphic language the specification of an interface function making use of alphanumeric displays, and the actions of an operator on a keyboard. The invention makes it possible to draw up a network of interconnected symbols, control its coherence and validate the obtained specification. It is thus possible to control the coherence of the specifications, their accuracy and completeness.

The equipment vendor responsible for developing the embarked software associated with this function can base its development on stricter specifications. He can also develop a software automatic generation tool on the basis of the formalized specification. In this case, the software corresponds exactly to the contents of the specification.

BRIEF DESCRIPTION OF THE DRAWINGS

FIG. 1 illustrates the transmission of information between a computer and a control terminal at the disposal of an operator, as well as the processing of said information;

FIG. 2 illustrates the object of the method of the invention;

FIG. 3 illustrates an initialization page of the control screen;

FIGS. 4 to 8 show a first example of boards for constructing a specified display page;

FIGS. 9 to 13 illustrate a second example of boards for constructing a specified display page.

FIGS. 14 to 23 illustrate various symbols which may preferable be used for the detailed specification of the MCDU interface function.

DETAILED DESCRIPTION OF THE PREFERRED EMBODIMENT

This invention relates to an aid system and method concerning the specification of an interface between a control terminal in an aircraft and at the disposal of an operator, such as a pilot, and one or several computers helping in piloting and the navigation of the aircraft, the computer including at least one memory containing at least one software for managing the interface, the specification implementing alphanumeric displays on the screen and the actions of the operator on the keyboard.

In the rest of the description, by way of example, an MCDU (Multipurpose Control and Display Unit) is considered.

MCDU Terminal

This terminal is an output/input terminal with a cathodic or other color screen, an alphanumeric keyboard and function keys used by pilots and the ground personnel so as to dialogue with various computers and in particular the flight management computer, the maintenance computer and the communication computer.

The screen of the MCDU terminal 1 shown in FIG. 1 is composed of fourteen lines each comprising twenty-four characters.

The fourteen lines are divided up as follows:
  a <<title>>0 line listing the title of the information shown on the screen at a given moment;
  six pairs of lines making it possible to display information fields which reflect the state of the data taken into account and drawn up by a computer. Each paid of lines is composed of:
    the upper line known as the <<label line>> generally used to give a title to the information field(s) displayed on the lower line,
    the lower line known as the <<data line>> generally used to display the values of one or several information fields;
  a scratchpad line used by a computer to display messages intended for the operator so as to communicate the values of certain fields to a computer.

An MCDU page is composed of all the information displayed on the screen. The communications of the operator to a computer are effected by means of four key categories:
  the mode keys 2 allow for access to the pages of the flight or FM monitor;
  the alphanumeric keys enabling the operator to introduce a value into the scratchpad;
  the line keys 3 (1L, 2L, . . . 1R, 2R, . . . see FIG. 3) shall make it possible to activate a function of a computer which acts on the field(s) designated by this key in relation with the contents of the scratchpad. These keys are situated on both sides of the <<data line>> lines;
  the function keys 4 allow for:
    movements inside the MCDU pages or between MCDU pages;
    the erasing of the scratchpad, and indirectly the return to the values by default of one of the fields displayed on a <<data line>> line <<clear>> key).

In the FM (flight management) system, the MCDU terminal 1 is used to:
  show the operator 5 the internal state of the system;
  offer the operator 5 the possibility of modifying the internal state of the system by data inputtings;
  alert the operator 5 via the displaying of messages;

The information is showed by pages containing functionally coherent information.

The pages are arranged hierarchically in sequence inside page families. A page family is a set of operationally interlinked MCDU pages.

Access to a family is effected by either a decision of the operator (pressing on a mode key) or via the authorization of the FM system (modification of the general context of the fight).

Tracking inside a family is carried out following a request by the operator by means of the line keys or function keys.

Three levels (6, 7 and 8) carry out the bidirectional transmission and processing of information between the operator 5 and the FM system 9.

The <<information transmission/receiving level>> 6 shapes the data passing through on the MCDU-FM system link 10 as per, for example, the standard Aric 739 and the protocol for exchange between the computer 1 and the control terminal (MCDU).

The <<information preparation>> level 7 is used as a relay between the actual processing of the FM system (referred to as the functional processing in the remainder of the document) and the <<information receiving/transmission>> level 6. It functions to:
  check the coherence of the information acquired by the operator according to their syntax and the general execution context;
  carry out a preliminary check on those actions requested by the operator and, if appropriate, transmit an informative message to the operator;
  associate with the information received from the functional processing the display attributes and pre-format this data for the <<information transmission/receiving>> level.

The <<functional processing>> level 8 carries out the entire functional processing linked to an FM system. In particular, it semantically checks the information (data and requests for action) received from the operator, calculates the values of the information to be displayed and defines the displaying context, and executes the requests sent by the operator.

Two types of information can be displayed: information belonging to a screen page (<<full page>> information) or an error or warning message at the level of the scratchpad.

The <<full page>> information is drawn up by the <<information processing>> level. The pre-formatting of a full page information consists of transforming a value with the internal format of the computer into alphanumeric characters by observing the display directives (number of characters, columns and justification of display) associated with its size and color information. All this is then transmitted to the display process of the <<information transmission/receiving>> level.

A message advises the operator of the arrival of a particular event or the temporary incoherence of the system.

There are two types of messages: first type messages corresponding to responses to the actions of the operator, and second type messages originating from the functional processing and which are stored in a waiting line.

Priority is given to first type messages.

The waiting line of second type messages is an <<LIFO>> (Last in First Out—i.e., the last message stored in the first message displayed) circular type waiting line without any homonym.

Incoming information may be either an alphanumeric character or a request for action.

An alphanumeric character is stored for subsequent processing triggered by pressing on a line key. A maximum of twenty-two characters can be input, the following ones being ignored.

The request for action are divided into three groups:
the function keys: they allow for direct action on display;
vertical or horizontal scrolling of information,
change of page within a page family,
erasing the final character or all the characters of the scratchpad,
the mode keys: they allow changing information page families;
the line keys: they allow allocating the value of the scratchpad to one or several items of information and requesting the execution of specific actions.

Elements Required for Drawing Up Specifications

The specification requirement is represented on start up by a relatively structured document 16 defining the way to represent the information of the screen of the control terminal: definition of the various pages and the contents of each. The transcription of these specification requirements shall make recourse to a dictionary containing the definitions of the data available in the computers concerned and their nature:
name of each data element;
type of each data element: Boolean, numeric, alphanumeric, matrix, etc.

Specification Phase

The detailed specification phase 12 (FIG. 2) is based on the elements listed above. This phase results in delivery of the specification intended to feed a software generation terminal constituting the production chain 13 of the software of the MCDU function of the FM system.

The method of the invention, reference 14, which is an aid specification method, consists of the following:
the specification is expressed in a data flow type graphic language including symbols relating to the display attributes by using a processing terminal;
these symbols are connected by links so as to express:
a display specification of a page on said screen,
a description of all the elementary actions associated with this display configuration;
a formalized specification is then obtained;
after processing said formalized specification in a software generation computer, the management software of said interface is obtained.

The invention relates to the specification of the textual display function (of texts as opposed to drawings) on a screen.

It has been envisaged to allow for the formalized specification of logic and information display characteristics on an aircraft multifunction terminal, for example from the Airbus range (MCDU), as well as the actions carried out on this terminal.

The detailed specification could include three major portions:
the specification of the MCDU pages: all the boards describing the displaying of the MCDU pages and the effects of pressings on keys linked to the pages;
the specification of overall actions: all the boards describing the effects of pressing on certain keys, such as the mode keys, as well as the effects on the displaying of the arrival of FM events;
additional definitions 15: all the boards containing support tables with diverse definitions, display formats, acquisition formats, the list of FM messages and others essential for control of overall specification coherence.

The boards indicated above are transcribed into computer files.

Dynamic Windows

The invention is intended to draw up the specification of various types of display (pages) on the MCDU, especially the <<static displays>> and <<dynamic windows>>. The paragraph below specifies the requirement for dynamic windows. These windows are characterized by the fact that they permit use by means of function keys (special keys) for browsing a list, only one portion being displayed on the screen; the information elements being <<run off or scrolled>> from top to bottom.

The processing of the scrolling of elements inside a dynamic window includes:
the drawing up of the list of the elements to be shown in the window according to the potentially displayable and available data in the heart of the FM system, as well as the scrolling actions which have already been carried out. The software generating this list on the basis of the information of the FM system is developed manually (this software does not form part of the invention);
the display of the elements of the defined list which differs from <<static displays>> in that it is only specified once for the various elements which can be displayed:
the specification of the display of an element covers all the possibilities of display of the various elements which maybe present in the list,
the display coordinates of each information field are not known a priori (owing to the scrolling possibility), but dependent on the row of each element to be displayed;
the evolution of the list with respect to the first element in the display window in the event of external stimuli (pressing one of the scrolling or automatic scrolling keys of the list without the intervention of the user) which is generated by the software for drawing up the list on the basis of the information of the FM system shown above.

Construction of a Specified Display Page

There now follows two examples of boards for constructing a specified display page.

FIRST EXAMPLE

FIG. 3 illustrates an initialization page of the flight management system (FMS) and designated INIT B.
Title line
As shown in FIG. 4, the chain of <<INIT>> a characters of the first display line shown at 20 between the display symbol 21 in which its display attributes are defined are as follows:

W: white color

L: large character

L: left justified

TITLE: title line

11: from the 11$^{th}$ column

The character <<←->> featured at the top right of the screen in FIG. 3 is shown at 22 (FIG. 4) by the characters $< and enters the display symbol 23 in which its display attributes are defined:

W: white color

S: small character

R: right justified

TITLE: title line

23: from the 23$^{rd}$ column

The symbol 24 corresponds to display on the title line.

The symbol 25 corresponds to the action to be effected on pressing of the <<preceding page>> function key displaying of the INIT A page.

The symbol 26 corresponds to the action to be effected on pressing of the <<next page>> function key: displaying again of the INIT A page.

The symbol 27 corresponds to the group of actions associated with the <<preceding function>> and <<next page>> keys.

The symbol 28 corresponds to the title line/action display combination.

Field of the key 1L

The key 1L (FIG. 3), like all the other keys, is allocated to a pair of lines.

As shown in FIG. 5, the chain of <<TAXI>> characters 30 enters the symbol 31 where it rejoins its display attributes:

G: white color

S: small character

L: left justified

DL1: label line 1

1: from column 1.

The fuel amount ("TAXI-FUEL") resulting from a calculation by the FMS is provided to the symbol 32 where it rejoins its display attributes.

G: green color

S: small character

L: left justified

DL1: data line 1

1: from column 1

The symbol 33 combines the two channels.

Field of the key 1R (FIG. 3)

The following explanations relate to the <<ZFW>> (<Zero Fuel Weight>or off-load weight without fuel) field dealt with in FIGS. 6, 7, and 8. The symbols 35 and 36, FIG. 6, make it possible to extract from the structured data ZFW its numerical value and a Boolean which indicates as to whether it is defined. This Boolean is used by the symbol 42, FIG. 7, which is used to make a cross between the information elements derived from the symbols 37 or 39. If the value of ZFW is defined (Boolean at <<TRUE>>), the symbol 37 gives it its display attributes and the symbol 42 sends it to the symbol 43; otherwise it is the value defined by the symbol 38 which receives its display attributes from the symbol 39 and which is transmitted to the symbol 43.

In the symbols 37 and 39, the colors defined by the letters C and A correspond to the colors cyan blue and amber.

The character <</>> defined at 40 receives its attributes from the symbol 41.

The symbol 43 allows for the combination of the information obtained.

The symbol 45, FIG. 8, specifies the action to be carried out following a possible pressing on the line key IR and the symbol 46 specifies the combination of the displays and actions linked to the line key 1R.

In the construction board of the INIT B page shown in FIG. 13, the data drawn up on the other boards is grouped together by means of the symbol 80.

The data which may be grouped on the latter board is as follows:

the data element relating to the title line which sometimes comprises, in addition to the information displayed on this line, the description of an association between the <<preceding page>> function and <<next page>> keys, and a change of page action;

as regards the data relating to the various pairs of lines or keys of associated lines, it may be possible to have one data element or several data elements per line pair (groupings for each line shall have been made previously);

the data element relating to the dynamic window(s) if the page has one;

the data element relating to the scratchpad line which sometimes comprises the description of an association between the <<slew-up>> and <<slew-down>> function keys and a scrolling action of a dynamic window on the page (possibly dynamic windows when the page has several windows).

SECOND EXAMPLE

FIGS. 9 to 12 illustrate the input of information into the scratchpad; this may be a quantity of fuel introduced into the system through the initialization page, FIG. 3, by means of acting on the key 2R (FIG. 3).

This value introduced into this scratchpad is controlled in the symbol 50.

The value itself is extracted in the symbol 51.

In the symbol 52, the resultant status of the control carried out by the symbol 50 is obtained when it is compared in the symbols 53 to 56 with various values defined in the symbols 57 to 60 so as to obtain several possible outputs:

format of the error input data;

valid input;

the scratchpad zone is empty;

the scratchpad zone contains the reset command (obtained via action of the key <<clear>> on the terminal) which is materialized by the abbreviations <<CLR>> appearing in this zone.

In FIG. 10, the <<valid input>> output (B-FMT-OK) is sent to the symbol 61 receiving the chain character received. The request is activated inside the system. At the outlet of this symbol 61, a request return status is obtained.

The symbols 62 and 65 make it possible to display the INITB page (62) or an error message (63) or do nothing (64) depending on the status which enters the symbol 65.

In FIG. 11, consideration is taken of the pressed <<clear>> key (B-SPAD-CLR). The symbol 67 asks the system to reset the value of ZFW. The symbols 68 to 70 make it possible to redisplay the initialization page (68) or do nothing (69) depending on the return status of the request 67 which enters the symbol 70.

In FIG. 12, the various outputs of the symbols 53 to 56 of FIG. 9 are introduced into a symbol 71 which makes it possible to select displaying different messages or a new page. The symbol 72 executes the selected action.

Examples of Symbols Used

The following describes various symbols shown in FIGS. 14–23 which may be used in one embodiment of the interface system and method for the detailed specification of the MCDU interface function.

The characteristics of each symbol are shown as follows: function, inputs, parameters, outputs, algorithm.

1) The symbol DISPLAY FIELD (FIELD.DSP) shown in FIG. 14 functions to transform elementary information into a chain of alphanumeric characters and associates with it these coordinates and display attributes.

Input

E1/1

Definition: This terminal point receives the value of the data element to be displayed.

Type: Not defined.

Sub-type: Informed by the SUB-TYPE parameter.

Parameters

NNN(1):

Definition: Symbol occurrence number.

COLOR: Associated terminal point E2/1

Definition: Color of the chain of characters to be displayed.

Type: ENUMERATE.

Sub-Type: COLOR

SIZE: Associated terminal point E3/1

Definition: Size of characters of the chain to be displayed.

Type: ENUMERATE

Sub-type: SIZE.

LINE:

Definition: Size of characters of the chain to be displayed.

COLUMN: Associated terminal point E4/1

Definition: This parameter specifies the display column of the first character to be displayed Type: NUMERIC.

Sub-type: REL_INT.

REF

Definition: This parameter specifies the display format reference.

SUB TYPE

Definition: This parameter gives information on the sub-type of the terminal point E1/1

JUST

Definition: This parameter specifies the justification of display of the information.

Output

S1/1

Definition: This terminal point provides the chain of characters and its display attributes.

Type: PRIVATE-MCDU

Sub-type: LINE

2) The symbol DISPLAY PAGE (PAGE.ACT) shown in FIG. 15 is used to define the request for displaying a page on a MCDU type IHM terminal.

Parameters

NNN(2)

Definition: Symbol occurrence number.

PAGE

Definition: Reference of the MCDU page to be displayed.

CLR

Definition: Indication of deleting user inputs contained in a tampon memory (e.g. scratchpad) during page display.

INDEX

Definition: Indication of the positioning of the listed index/indices on the first element during page display.

Output

S1/2

Definition: This terminal point provides the name of the page to be displayed and the initial display conditions.

Type: PRIVATE-MCDU.

Sub-type: PGE_MESS

3) The symbol EVENT DISPLAY MESSAGE (MES.DSP) shown in FIG. 16 is used to define the display of a message without any variable field to be effected on pressing a key of a MCDU type IHM terminal.

Parameters

NNN(3):

Definition: Symbol occurrence number

KEY

Definition: Identifier of the key for which a pressing triggers message display.

MESSAGE

Definition: Message reference.

Output

S1/3

Definition: This terminal point furnishes the number of the message to be displayed.

Type: PRIVATE-MCDU.

Sub-type: ACTION.

4) The symbol DYNAMIC EVENT CUSTOMIZED ACTION (DYNACT.DSP) shown in FIG. 17 is used for a dynamic window. This symbol triggers an action following pressing on one of the keys not known a priori.

Inputs

E1/4

Definition: This terminal point receives the reference of the list element displayed in relation to the key when pressing on the key.

Type: PRIVATE-MCDU

Sub-type: MARKER.

E2/4

Definition: This terminal point receives the physical number of the reference key of the associated element.

Type: ENUMERATE

Sub-type: LS_KEY.

Parameters

NNN(4)

Definition: Symbol occurrence number.

REL KEY

Definition: This parameter specifies the key of the terminal which triggers the action by giving its relative position with respect to the reference key of the element.

SIDE: Associated terminal point E3/4.

Definition: Indication of the side of the MCDU terminal on which the line key is located.

Type: ENUMERATE.

Sub-type: SIDE.

BOOK/CHAPTER/action name

Definition: Reference of the action carried out when pressing on the key of the terminal.

Output

S1/4

Definition: This terminal point provides the name of the action to be carried out.

Type: PRIVATE-MCDU

Sub-type: ACTION

5) The symbol EVENT SLEW BACKWARD (BACK.DSP) shown in FIG. 18 is able to trigger, following pressing on one of the keys of an MCDU type IHM terminal, the event slew backward of a list of elements able to be displayed inside a dynamic window.
Parameters
NNN(5)
   Definition: Symbol occurrence number
KEY
   Definition: Reference of the key triggering slewing.
List name
   Definition: Name of the list to be slewed.
Output
S1/5
   Definition: This terminal point provides the action to be carried out on the occurrence of the event by pressing on the key of the terminal.
   Type: PRIVATE-MCDU
   Sub-type: ACTION
   6) The symbol EVENT SLEW FORWARD (FORWARD.DSP) shown in FIG. 19 is able to trigger, following pressing on one of the keys of an MCDU type IHM terminal, the forward slewing of a list of elements able to be displayed inside a dynamic window.
Parameters
NNN(6)
   Definition: Symbol occurrence number.
KEY
   Definition: Reference of the key which triggers slewing.
List name
   Definition: Name of the list to be slewed.
Output
S1/6
   Definition: This terminal point provides the action to be carried out on the occurrence of the event pressed on the key of the terminal.
   Type: PRIVATE-MCDU
   Sub-type: ACTION
   7) The symbol MCDU PAGE CONSTRUCT (MCDUPAGE.DSP) shown in FIG. 20 is specific to the MCDU IHM, and stores event/action associations and the displaying of the MCDU page, the symbol being provided with a description of said page on input.
Input
E1/7
   Definition: This terminal point receives the description of the display and the event/action associations linked to an MCDU page.
   Type: PRIVATE-MCDU
   Sub-type: MIXED.
Parameters
NNN(7)
   Definition: Symbol occurrence number.
SAO' usage rules
   None.
   8) The symbol CHECK SCRATCHPAD 1 (SPAD1.ACT) shown in FIG. 21 is used to check the syntax of a chain of characters.
Inputs
E1/8
   Definition: This terminal point receives the data element to be controlled.
   Type: PRIVATE-MCDU
   Sub-type: SPAD.
Parameters
NNN(8)
   Definition: Symbol occurrence number
REF
   Definition: Reference of the format used to control the syntax of the field.
Output
S1/8
   Definition: This terminal point provides the report of the check and the value controlled in the form of a chain of alphanumeric characters.
   Type: STRUCTURE.
   Desc: SPAD_ST1.
   9) The symbol FM REQUEST (FMRQST.ACT) shown in FIG. 22 is able to invoke a request belonging to a function external to the function currently being defined and receive from it an execution report. Four parameters can be transmitted to the called service.
Inputs
E1/9
   Definition: This terminal point is able to receive the Boolean which authorizes the activation of the request.
   Type: BOOLEAN
Parameters
NNN(9)
   Definition: Symbol occurrence number.
E2/9, E3/9, E4/9
   Definition: These terminal points are able to connect the various parameters of the request.
   ALPHANUMERIC
   Sub-type: STRING.
E5/9
   Definition: This connection receives the identifier associated with the current element when the request is linked to a dynamic display zone.
   Type: PRIOVATE_MCDU.
   Sub-type: MARKER
DEFAULT STATUS
   Definition: Value by default of the execution report of the request.
BOOK/CHAPTER/request name
   Definition: Reference of the invoked request.
CONFIG
   Definition: Configuration of the parameters connected to the symbol so as to carry out the request.
Output
S1/9
   Definition: This terminal point furnishes a request return status value.
   Type: ENUMERATE.
   Sub-type: Fm_RQ_ST.
Description of the processing
Algorithm
if E1/9k=1 then S1/9k=f (REQUEST NAME)
otherwise S1/9k=DEFAULT STATUS
   10) The symbol ACTION CONSTRUCT (MCDUACT.ACT) shown in FIG. 23 is specific to the MCDU IHM, and displays on an MCDU type terminal a page and/or message defined in an action description.
Inputs
E1/10
   Definition: This terminal point receives the equipotential describing the display request resulting from the action.
   Type: PRIVATE_MCDU.
   Sub-type: PGE_MESS.

Parameters
NNN(10)
 Definition: Symbol occurrence number.
SAO'
 None.

I claim:

1. A method for providing a detailed formalization of a specification of an interface between a multi-purpose control and display terminal (MCDU) in an aircraft, and at least one of a flight management computer, a maintenance computer, or a communication computer, said computer for assisting the piloting and navigation of the aircraft, said MCDU including a screen and a keyboard operable by an operator including a pilot, said computer including at least one memory containing at least one management software for managing said interface, said specification implementing alphanumeric displays on said screen and actions performed by the operator on said keyboard, said method comprising the steps of:

expressing said specification in a corresponding data flow type graphic language including symbols relating to specified functions by using said at least one computer;

connecting said symbols by links, said symbols being directly linked into data flow paths so as to form a data flow diagram and so as to express a display configuration on said screen, a description of said actions able to be carried out by the operator, and a description of responses of the terminal on orders issued by the computer and independent of the actions of the operator:

providing the specification to said at least one computer making possible a check of coherence and accuracy of the specification.

2. Method according to claim 1, wherein the display configuration consists of:

a drawing up of logic for conditioning the displaying configuration shown on the screen;

a description of presentation characteristics of the information to be displayed including color, size, and position on the screen;

an association of possible actions with pressings on the keyboard line keys of functional keys, parts of said keyboard, affected coherently with display.

3. Method according to claim 1, wherein an editor is able to select the symbols, corresponding to the elements of the specification graphic language, which are stored in computer files.

4. Method according to claim 1, wherein the display configuration on the screen includes static portions and dynamic windows.

5. Method according to claim 1, wherein the elementary actions able to be carried out by the operator are associated with the display configuration on the screen.

6. Method according to claim 1, wherein the specification is translated in the form of computer files.

7. Method according to claim 1 and which is used in an aircraft, the computer helping in guiding and navigating this aircraft.

8. A system comprising:

a multi-purpose control and display terminal (MCDU) in an aircraft having a screen and keyboard operable by an operator including a pilot;

at least one of a flight management computer, a maintenance computer, or a communication computer, said at least one computer for assisting the piloting and navigation of a aircraft and including at least one memory containing at least one management software for managing said interface;

an interface system having an associated specification of an interface between said MCDU and said at least one computer, said specification for implementing alphanumeric displays on said screen for controlling actions by the operator on said keyboard, said specification being expressed in a data flow type graphic language including symbols relating to specific functions by said at least one computer;

said symbols being connected by links, said symbols being directly linked into data flow paths so as to form a data flow diagram and so as to express a display configuration on said screen, a description of actions able to be carried out by said operator, and a description of responses of said control and display terminal in response to said at least one computer and independent of said actions of said operator;

wherein said specification when provided to said at least one computer allows a check of coherency and accuracy of said specification.

9. The system as described in claim 8 wherein said screen and control keyboard are of a multi-purpose control and display unit (MCDU) multifunction terminal.

10. The system as described in claim 8 wherein said display configuration includes:

logic for conditioning the displaying configuration shown on the screen;

an associated description of presentation characteristics of the information to be displayed including color, size, and position on the screen;

an association of possible actions with pressings on the keyboard line keys of functional keys, parts of said keyboard, affected coherently with display.

11. The system as described in claim 8 further including an editing means able to select said symbols.

12. The system as described in claim 8 wherein said display configuration further includes static portions and dynamic windows.

13. The system as described in claim 8 wherein said actions are associated with said display configuration on said screen.

14. The system as described in claim 8 wherein said specification is stored in said at least one memory.

15. The system a described in claim 8 wherein said computer system is a computer system for assisting in the guidance and navigation of aircraft.

* * * * *